UNITED STATES PATENT OFFICE.

ROBERT PRICE, OF JERSEY CITY, NEW JERSEY.

IMPROVED COMPOSITION FOR LINING PETROLEUM-BARRELS.

Specification forming part of Letters Patent No. 49,152, dated August 1, 1865.

*To all whom it may concern:*

Be it known that I, ROBERT PRICE, of Jersey City, in the county of Hudson and State of New Jersey, have invented certain Improvements in Preparing Barrels and other Vessels to Contain Petroleum-Oil or other Similar Substances, of which the following is a specification.

It has been found very difficult in practice to prevent the leakage and waste of petroleum-oil and other substances of a similar nature through the pores and crevices of the barrels or vessels which contain them. It has also been found in regard to many of the preparations or coatings now in use that, although the leakage may have been wholly prevented when the barrels or vessels were new, yet the spring of the staves during transportation has the effect of cracking, breaking up, or injuring the coatings to such an extent that the leakage has been very imperfectly prevented.

The object of my invention is to remedy these difficulties; and it consists in treating the barrel or vessel, both inside and outside, with a solution of salt, glue, hyposulphate of soda, and sulphate of iron, then applying to the vessel or barrel, both inside and outside, a coating of shellac-varnish, and, finally, coating the inside of the barrel or vessel with a coating of asphaltum, glue, and powdered soapstone, as hereinafter more fully described.

I dissolve two quarts of salt, twenty pounds of glue, ten pounds of hyposulphate of soda, and ten pounds of the sulphate of iron in forty gallons of water, and the same proportions for larger quantities. Then I boil the solution, and while hot I expose the barrel or vessel, or the staves and heads of which the barrels or vessels are to be made, for five minutes to the action thereof, after which I allow the said barrels or vessels to dry for about half an hour. Next I coat the barrel or vessel inside and outside, or the staves and heads of said barrels or vessels, with a shellac-varnish formed by dissolving shellac in alcohol in the proportions of one pound of shellac to two gallons of alcohol. Said shellac-varnish may be applied with a brush, by rinsing it through the inside of the barrel or vessel, or in any convenient way. Next I form a cement in the following proportions—viz., four pounds of glue dissolved in ten gallons of water and mixed with one quart of asphaltum-varnish. With this cement I then wash or coat the inside of the barrel or vessel, and while wet give it a coating of powdered soapstone. When thoroughly dry I give it another coating of the asphaltum and glue, again let it dry, and the barrel or vessel is then ready for use, and the barrel will be found to be coated with a hard elastic substance impervious to the action of petroleum or of similar substances, and which will not be injured by the springing of the staves in transportation.

I claim—

The preparation of barrels or other vessels for containing and transporting petroleum-oil or similar substances, substantially as described, and for the purposes set forth.

ROBERT PRICE.

Witnesses:
 THOS. P. HOW,
 JAMES T. GRAHAM.